(12) United States Patent
Kyle et al.

(10) Patent No.: US 9,077,220 B2
(45) Date of Patent: Jul. 7, 2015

(54) PIPELINE TURBINE GENERATOR

(71) Applicants: Christopher L. Kyle, Greenbriar, AR (US); Billy E Pierce, Tyler, TX (US)

(72) Inventors: Christopher L. Kyle, Greenbriar, AR (US); Billy E Pierce, Tyler, TX (US)

(*) Notice: Subject to any disclaimer, the term of this patent is extended or adjusted under 35 U.S.C. 154(b) by 0 days.

(21) Appl. No.: 14/063,158

(22) Filed: Oct. 25, 2013

(65) Prior Publication Data
US 2014/0117669 A1 May 1, 2014

Related U.S. Application Data

(60) Provisional application No. 61/795,845, filed on Oct. 30, 2012.

(51) Int. Cl.
| | | |
|---|---|---|
| E21B 33/035 | (2006.01) | |
| H02K 7/18 | (2006.01) | |
| F17D 1/02 | (2006.01) | |

(52) U.S. Cl.
CPC ............... *H02K 7/1823* (2013.01); *F17D 1/02* (2013.01); *H02K 2213/09* (2013.01)

(58) Field of Classification Search
USPC ........................................................ 290/1 R
See application file for complete search history.

(56) References Cited

U.S. PATENT DOCUMENTS

| | | | | |
|---|---|---|---|---|
| 4,013,945 A | * | 3/1977 | Grosso ..................... 324/207.25 |
| 4,152,936 A | * | 5/1979 | Boykin et al. ................... 73/198 |
| 4,155,022 A | * | 5/1979 | Crockett ....................... 310/168 |
| 4,377,091 A | | 3/1983 | DeCarlo |
| 4,488,055 A | | 12/1984 | Toyama |
| 4,654,537 A | * | 3/1987 | Gaspard .......................... 290/54 |
| 4,731,545 A | | 3/1988 | Lerner |
| 4,740,711 A | | 4/1988 | Sato |
| 5,839,508 A | * | 11/1998 | Tubel et al. .................. 166/65.1 |
| 6,975,043 B2 | * | 12/2005 | Schumacher et al. ........ 290/1 R |
| 6,998,724 B2 | * | 2/2006 | Johansen et al. ............. 290/1 R |
| 7,112,892 B2 | | 9/2006 | Mahowald |
| 7,190,088 B2 | | 3/2007 | Heidel |
| 7,579,703 B2 | * | 8/2009 | Shifrin ............................ 290/52 |
| 7,723,860 B2 | | 5/2010 | Nagler |
| 7,768,146 B2 | | 8/2010 | Balzano |
| 7,945,973 B2 | | 5/2011 | Khorshid |
| 7,959,411 B2 | * | 6/2011 | Schlabach et al. ........ 416/227 A |
| 7,980,143 B2 | | 7/2011 | Peleg |
| 2005/0248161 A1 | | 11/2005 | Heidel |
| 2008/0217923 A1 | | 9/2008 | Yen |
| 2008/0231057 A1 | * | 9/2008 | Zeuner ............................ 290/54 |
| 2008/0284174 A1 | | 11/2008 | Nagler |
| 2012/0031518 A1 | | 2/2012 | Smith et al. |

FOREIGN PATENT DOCUMENTS

GB 2266546 A * 11/1993 ............ E21B 33/035

* cited by examiner

Primary Examiner — Joseph Waks
(74) Attorney, Agent, or Firm — Sue Z Shaper PC

(57) ABSTRACT

A pipeline turbine generator for generating electric power from fluid flowing in a pipeline, the pipeline associated with, and downstream of, a wellhead, and either the pipeline including a valve proximate a chemical injection pump for the pipeline or including secondary piping inserted into the fluid line between the wellhead and a downstream facility, the secondary piping in fluid communication with the turbine and creating a secondary fluid flow path for the turbine.

8 Claims, 14 Drawing Sheets

CIPS

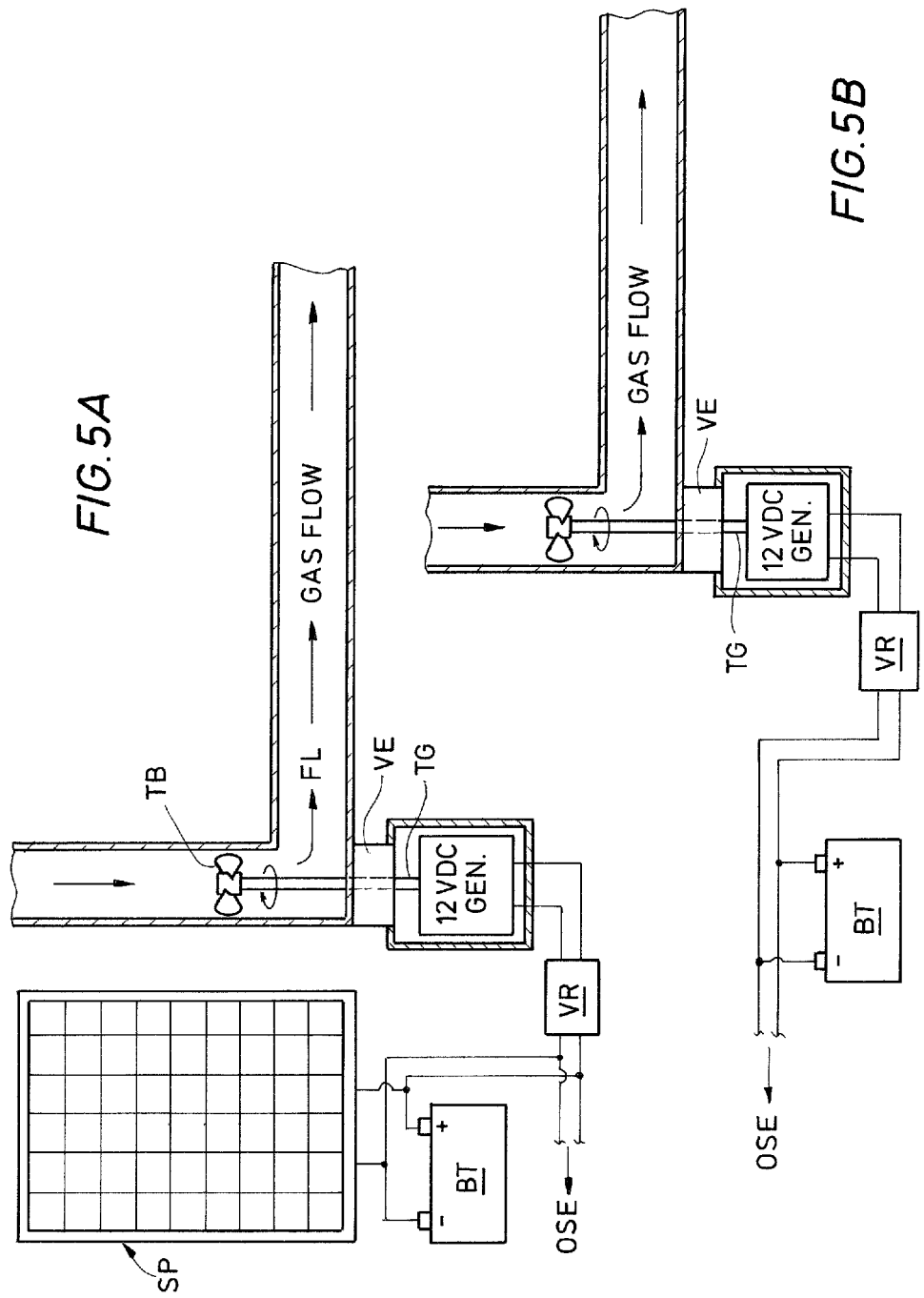

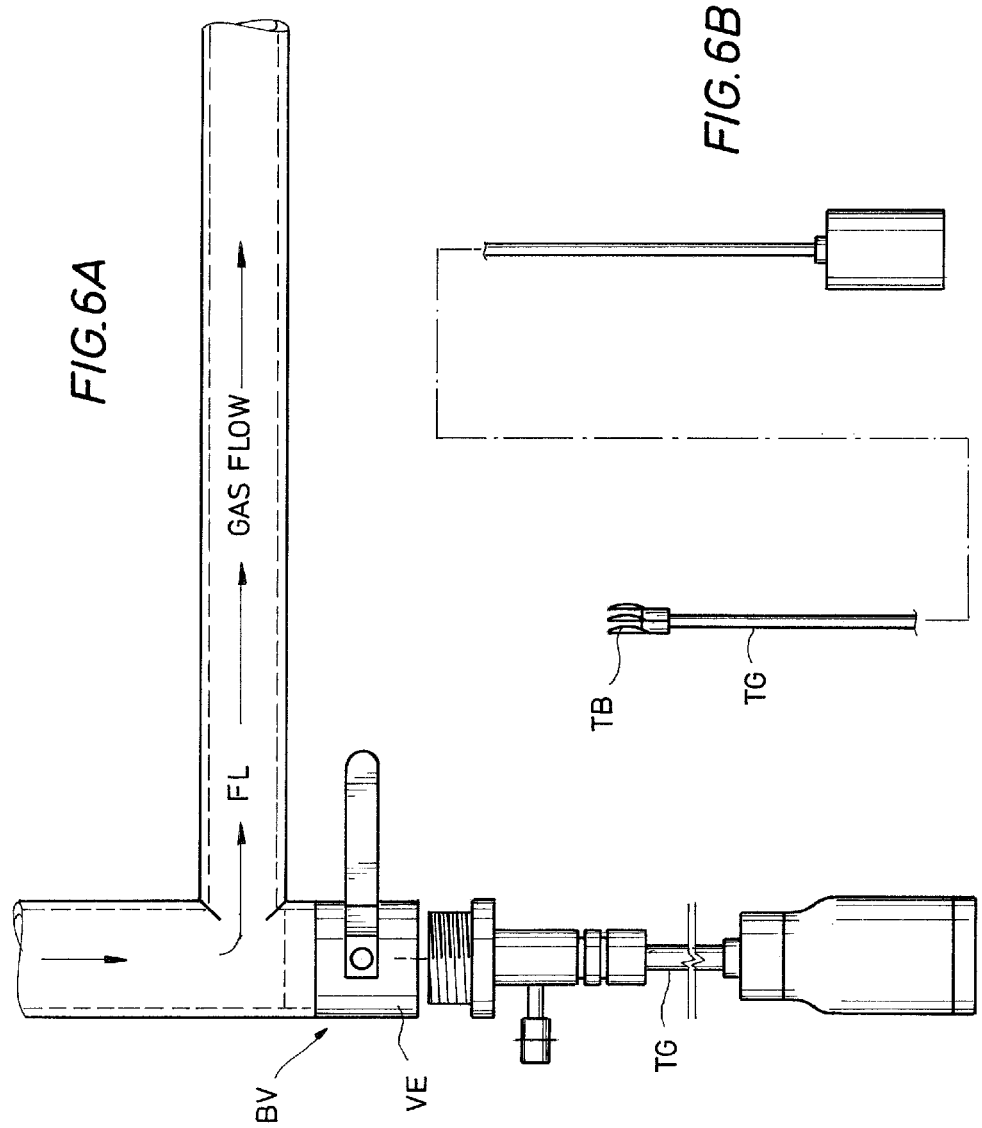

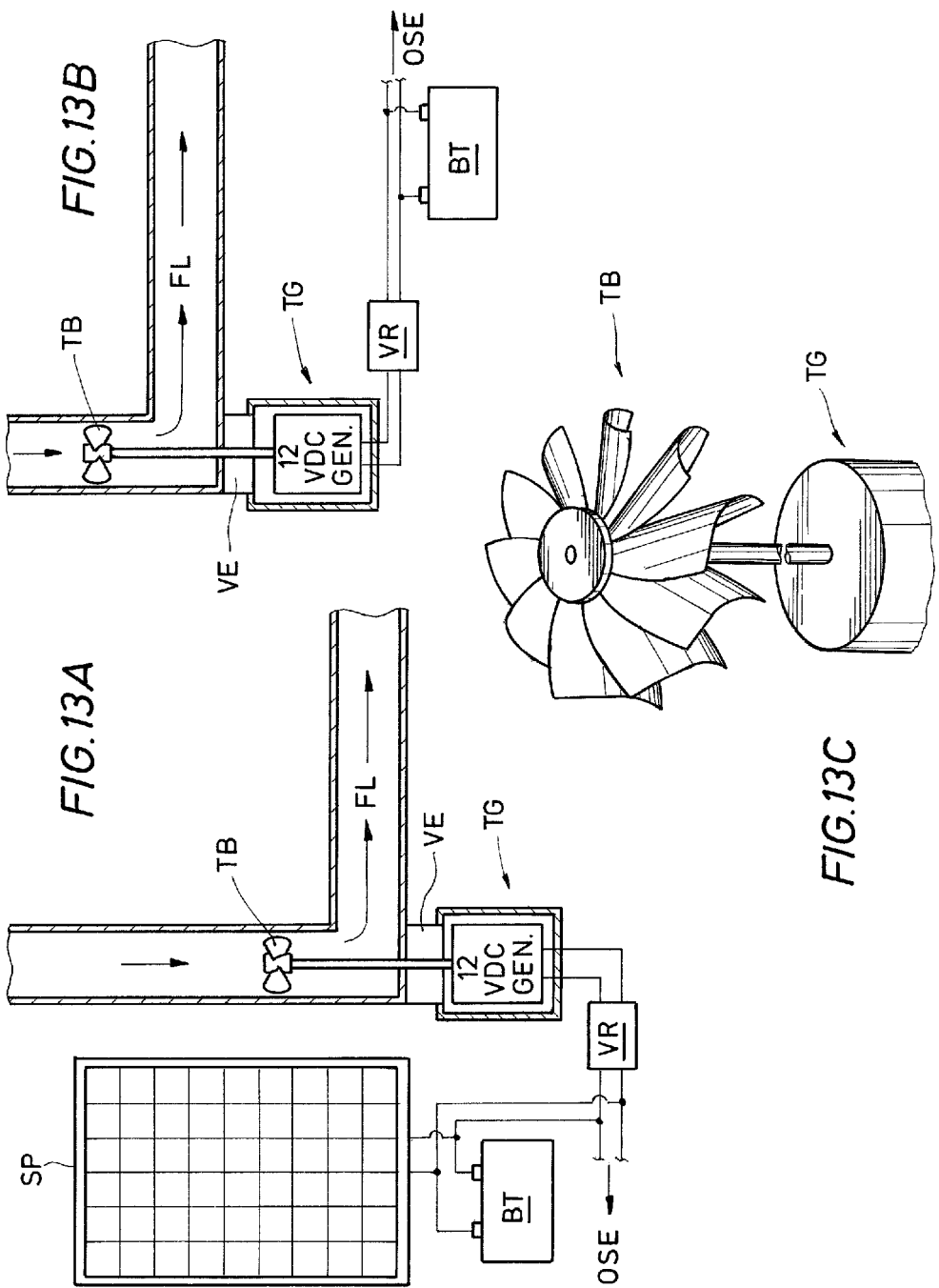

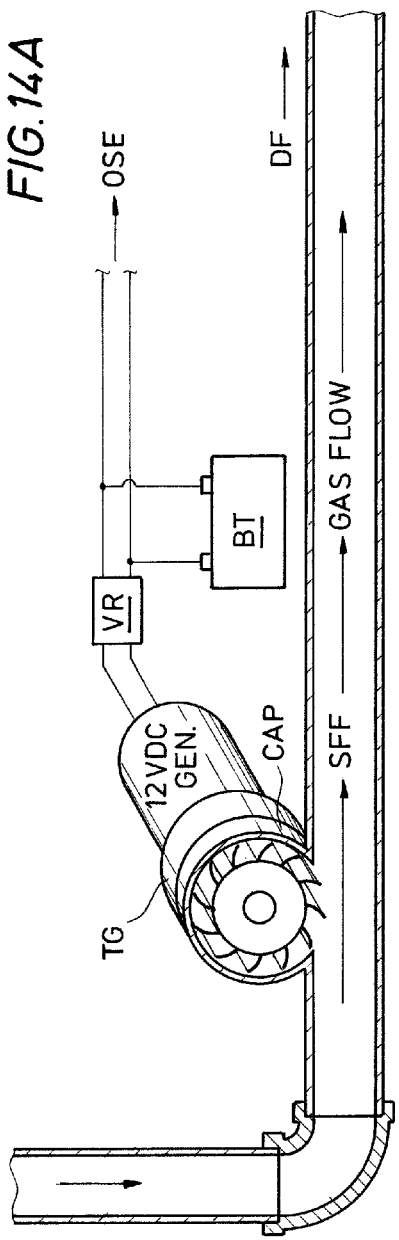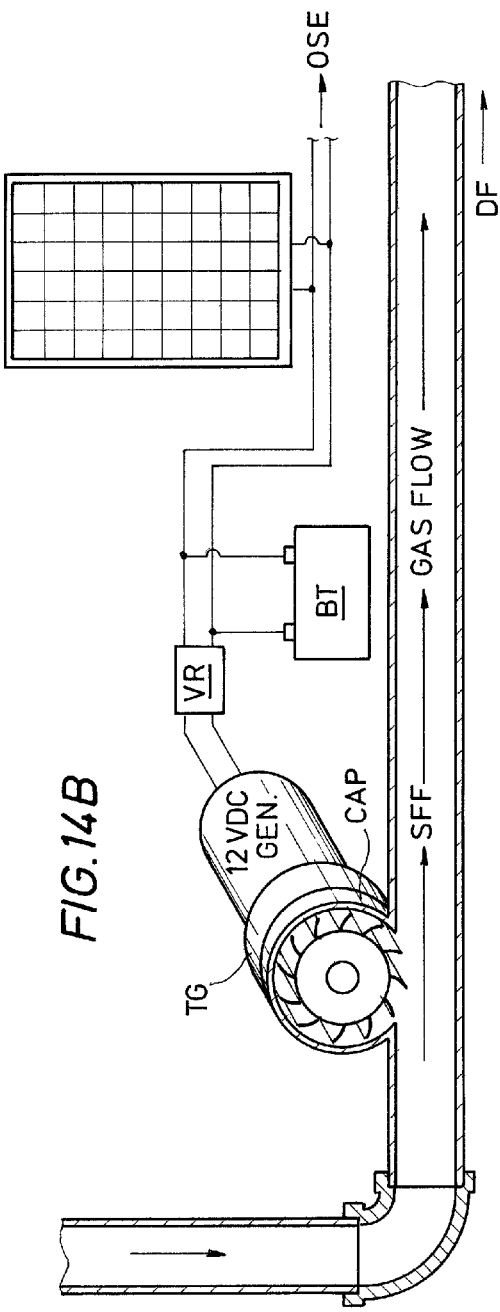

PIPELINE TURBINE GENERATOR

This application is related to and claims priority to provisional patent application No. 61/795,845 filed Oct. 30, 2012, entitled Pipeline Generator, inventors Chris L. Kyle and Billy E. Pierce. The above referenced provisional application is herein and hereby incorporated by reference in its entirety.

FIELD OF THE INVENTION

The field of the invention lies in inline generators for generating electric power using flowing fluid in a line, and in particular comprises pipeline turbine generators for generating electricity from fluid flow in lines from a wellhead toward downstream facilities, preferably located either proximate a chemical injection pump for the line or a location suitable for the insertion of secondary piping creating a secondary fluid flow path.

BACKGROUND OF THE INVENTION

Pipelines running from wellheads to downstream facilities frequently have a need for a source of power to operate related equipment. The need for power frequently occurs at locations well off the power grid.

Environmental agencies prefer, or dictate, that a source of such power produce no undesirable emissions, as might a gasoline powered generator. Regulatory authorities prefer sources of power along pipelines to be green. Frequently this dictates that the source of power be a battery and that the battery be charged by a green source of power such as solar or wind. However, it is well known that solar and wind power are not 100% reliable. Other difficulties with solar or wind power include seasonally diminished performance, high cost, wear and tear on batteries and lack of continuity. The instant invention proposes to use the motive force of the fluid flowing through the line as a source of, or a supplemental source of, power for a turbine and generator, the turbine and generator generally structured and scaled to be of a size sufficient to maintain charge on a 12-volt battery. Further, in the circumstances of the production of sour gas, there is significant concern associated with creating any new opening in a pre-existing line, creating thereby a potential for the deadly escape of sour gas. Hence, an inline generator is preferred in such circumstances which can utilize a pre-existing safeguarded valve opening in a line, the valve existing for such purposes as the insertion of other instruments, such generator to be preferred from an overall safety and maintenance standpoint.

In general, challenges faced in producing natural gas include pipe corrosion, sour gas as mentioned above and restrictions on the production of water as well as other EPA and OSHA regulations. Typically, thus, at a natural gas well site there is found a wellhead, a separator, water tanks, flow lines, a chemical injection pump system, measuring instrumentation, a lighting system and pipelines. Chemicals injected may include corrosion inhibitors, scale inhibitors, H2S scavengers, foamers and bio-sides. In particular, a line containing sour gas from a wellhead to a downstream facility is frequently associated with a chemical injection pump.

One very significant problem with pipe lines running from a wellhead to downstream facilities is that the pipeline may include sour gas, or hydrogen sulfide (H2S), as mentioned above. H2S at over 200 ppm can be deadly. Pipeline regulations require gas to be under 4 ppm H2S before entry into the pipeline. Further, H2S dissolved in water creates an acidic solution that increases the corrosion rate and leads to early pipe failure. For such reasons chemicals are typically injected by a chemical injection pump into the fluid flow in a pipeline, proximate the wellhead. Among other reactions, the chemicals react to H2S causing bonds to be broken and allowing sulfur to precipitate out. A constant flow of chemical will be typically desired for optimal results, and it is important that the chemical pumps perform adequately and reliably.

SUMMARY OF THE INVENTION

The invention comprises a pipeline turbine generator for generating electricity from flowing fluid in a line, the flow line associated with or downstream of a wellhead and prior to significant downstream processing facilities. In one embodiment the flow line is generally proximate a chemical injection pump for the flow line proximate the wellhead. In such embodiment the pipeline turbine generator includes a turbine and associated generator structured and sized to a scale appropriate to charge a 12-volt battery. Preferably, the turbine has retractable and extendable blades, structured in contracted configuration to insert into and remove from a pre-existing valve, where the valve is located on a fluid line running from a wellhead to a downstream facility, typically proximate a chemical injection pump. In this preferred embodiment the turbine generator includes blades structured to contract upon insertion into and upon extraction from the valve and to expand upon full insertion through the valve into the flow line.

Preferably further, the valve is located proximate an elbow of the fluid flow line. In particular when the fluid includes sour gas, it is preferred for the turbine generator to insert through a pre-existing valve structured for the insertion of instruments into the fluid flow line. Electric lines from the generator can be connected to a battery or can be connected directly to the equipment requiring power.

A second preferred embodiment includes a pipeline turbine generator for generating electricity from fluid flowing in a line associated with and downstream of a wellhead and running toward a downstream facility. The pipeline turbine generator includes again preferably a turbine and associated generator structured and sized and scaled to charge a 12-volt battery. In the second preferred embodiment the turbine and generator are connected to piping structured to insert into the fluid path to create a secondary path for the fluid through the secondary piping. The secondary path is in fluid communication with the turbine.

BRIEF DESCRIPTION OF THE DRAWINGS

A better understanding of the present invention can be obtained when the following detailed description of the preferred embodiments are considered in conjunction with the following drawings, in which:

FIG. 5 illustrates a first embodiment of the invention, wherein a turbine with retractable blades is inserted into a pre-existing valve in a gas flow line, the valve located adjacent to an elbow of the flow line, the associated generator shown connected to charge a battery.

FIG. 6 is an illustration of the embodiment of FIG. 5 showing a two-inch ball valve associated with the pre-existing valve and showing the turbine blades in retracted position.

FIG. 11 illustrates by photo and illustration how blades of a turbine, once the turbine is inserted into a flow line, can expand and fluid or gas force the blades to turn as the fluid or gas passes by.

FIG. 13 illustrates by photo and illustration a turbine and generator with retractable blades, together with a location for insertion through a valve at an elbow in a fluid flow line.

FIG. 14 illustrates a second preferred embodiment of the instant invention wherein a turbine and generator operate from fluid passing through a secondary path created in a fluid flow line by the insertion of additional secondary piping into the fluid flow line.

The drawings are primarily illustrative. It would be understood that structure may have been simplified and details omitted in order to convey certain aspects of the invention. Scale may be sacrificed to clarity.

DESCRIPTION OF THE PREFERRED EMBODIMENTS

Figure 1:
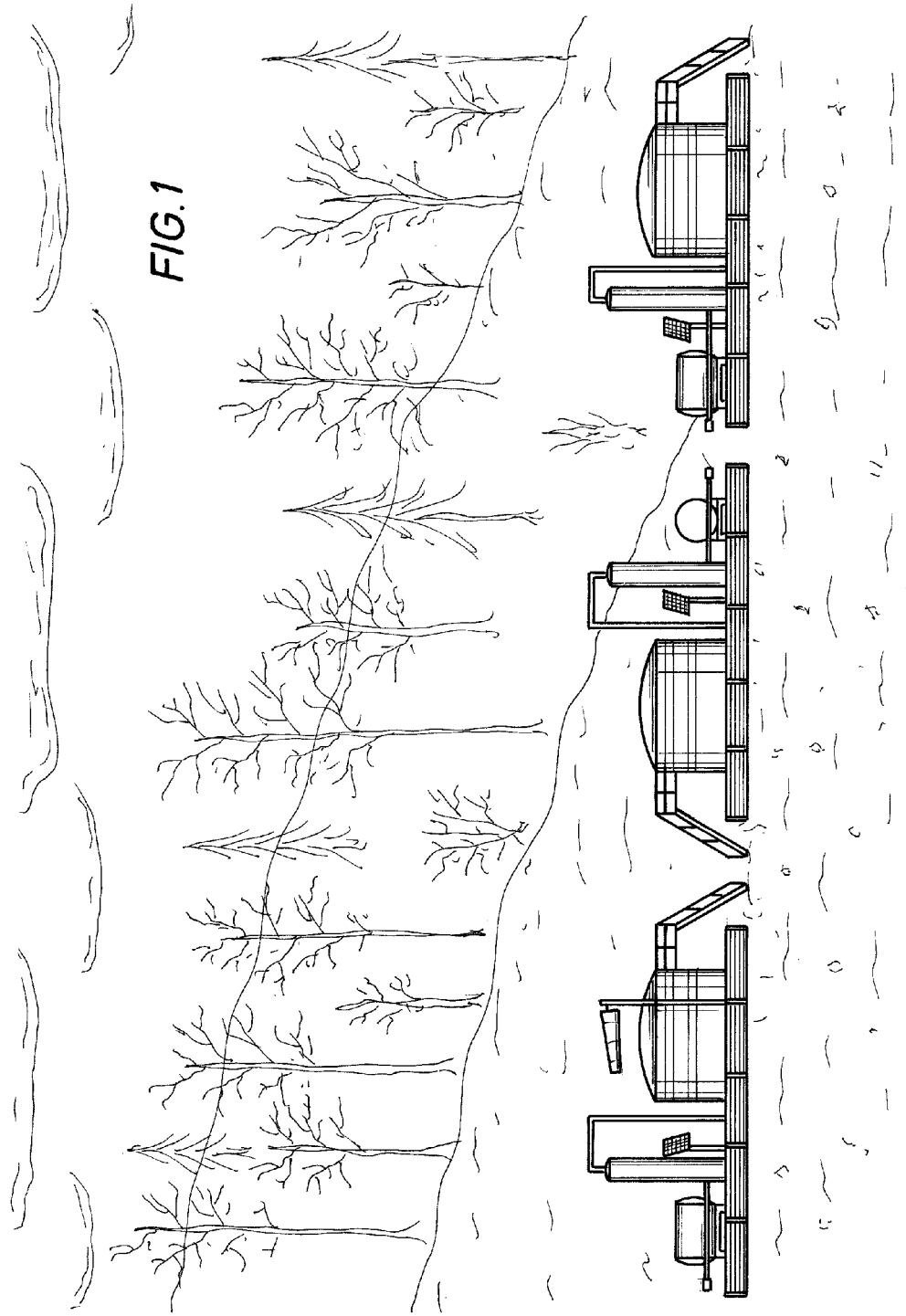
FIG. 1 is a photo of a natural gas well site, illustrating typical location and equipment.

For background support, FIG. 1 offers a photo of a typical natural gas well site NGWS. Such well site, as depicted, is generally located away from civilization and from the power grid of civilization.

Figure 2:
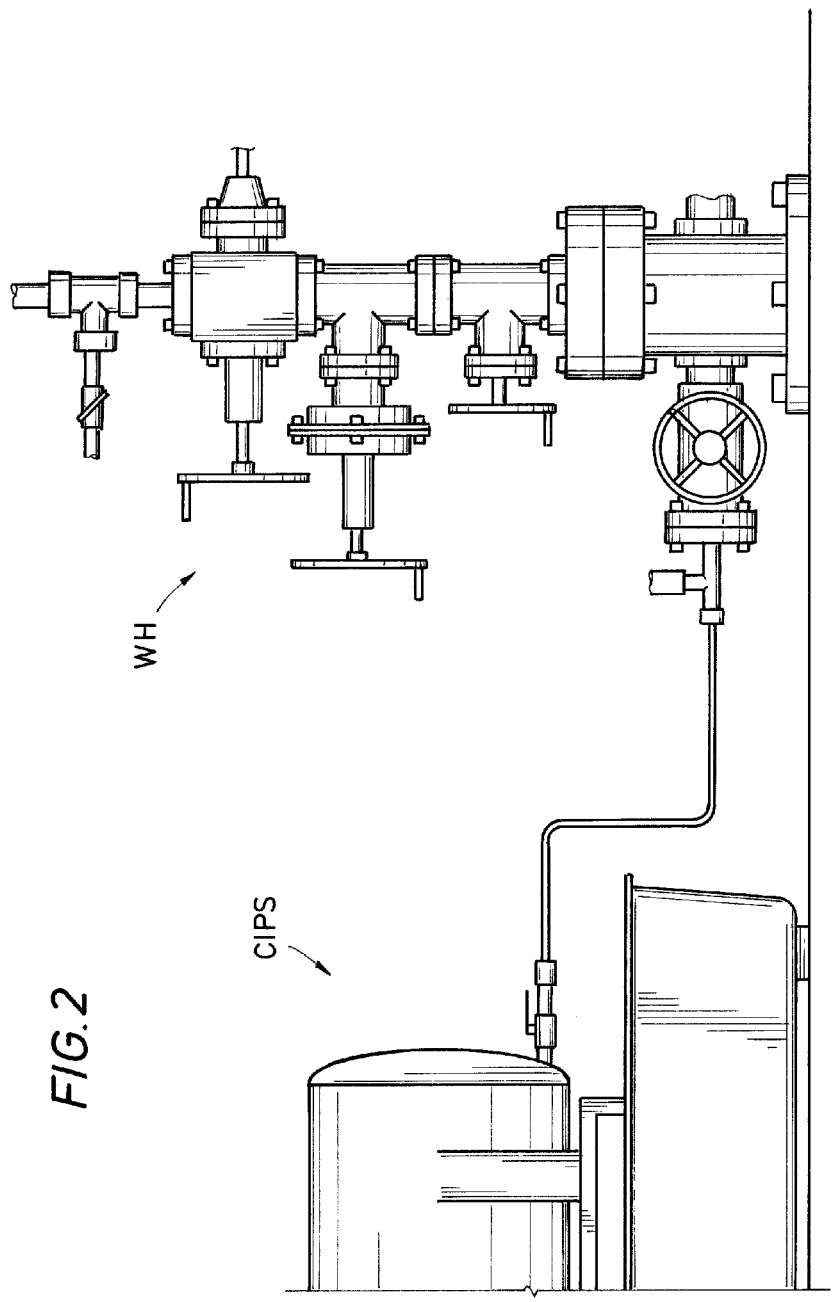
FIG. 2 is a photo of a wellhead located at the above natural gas well site, the wellhead shown connected to a chemical injection pump system.
Figure 3:
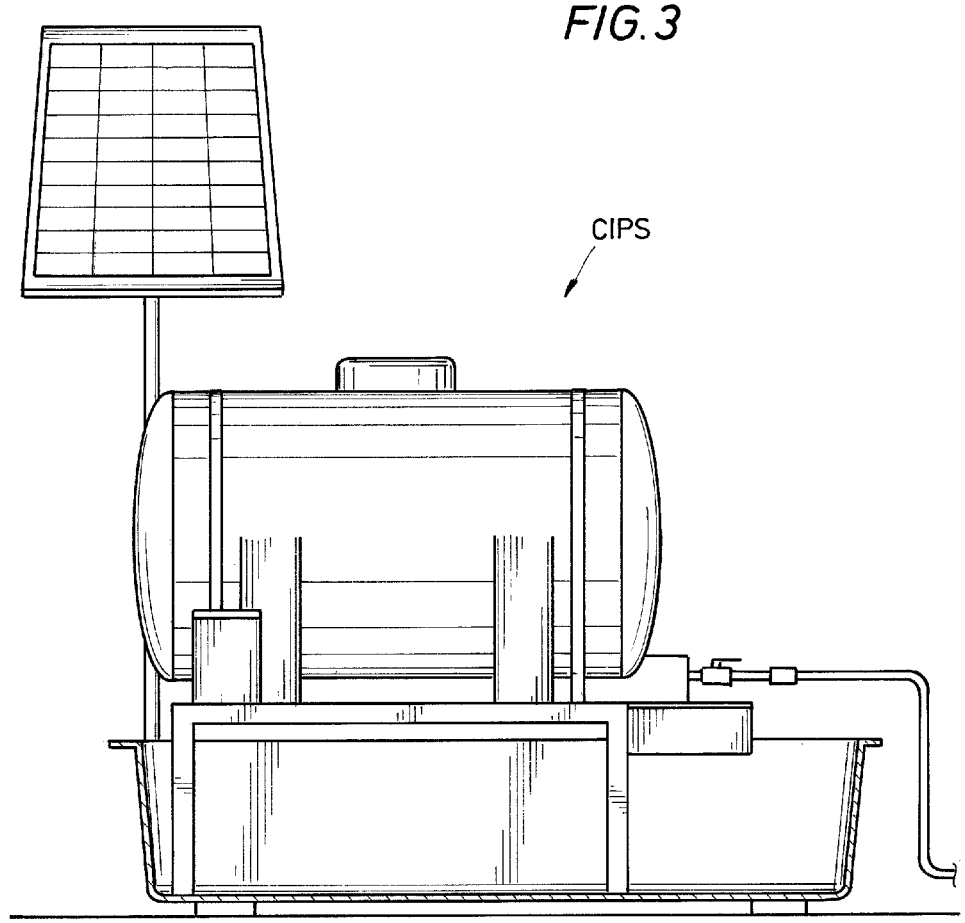
FIG. 3 illustrates a view of the above chemical injection pump system together with a solar power panel.
Figure 4:
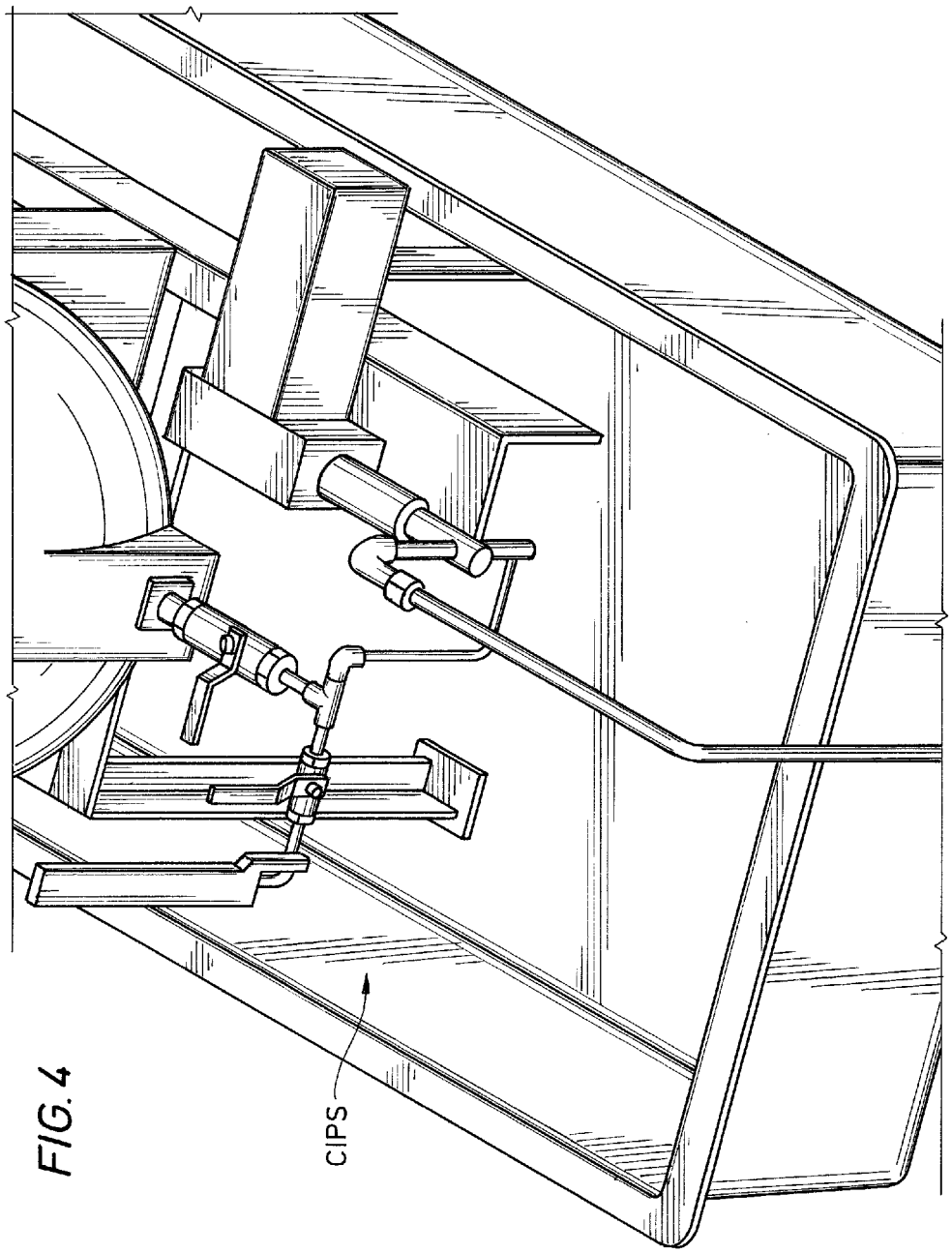
FIG. 4 illustrates details of the above chemical injection pump system.

FIG. 2, for background, illustrates equipment typically found at a well site including a natural gas well site. Wellhead WH is illustrated connected to chemical injection pump system CIPS. FIG. 3 further illustrates the typical chemical injection pump system CIPS together with a typical solar panel power supply for the battery of the chemical injection pump system. FIG. 4 illustrates in more detail portions of the chemical injection pump system, including a flow line coming into the chemical injection pump system from the wellhead.

FIG. 5 illustrates a first preferred embodiment of the instant invention. This embodiment is preferable when gas flow in the flow line FL is sour, or likely contains hydrogen sulfide. In this case a valve VE existing at an elbow of the flow line FL is located. A turbine generator TG is designed such that retractable expandable turbine blades can be inserted through pre-existing valve VE. Valve VE, as illustrated in FIG. 5, is typically provided for the insertion of instruments into the flow line. FIG. 5 also illustrates voltage regulator VR and power lines extending from the turbine generator TG through voltage regulations VR and to a battery BT, and thence power lines from the battery BT to on site equipment OSE. A solar panel SP is also illustrated, as the instant invention is compatible with providing power both from a solar panel and inline flow. The turbine generator can be used singly or in conjunction with solar energy.

FIG. 6 illustrates a close-up of a portion of the first preferred embodiment. FIG. 6 illustrates that valve VE includes a two-inch ball valve BV. FIG. 6 by illustration also offers an outside view of an embodiment of the instant turbine generator TG and an inside view of the embodiment of an instant turbine generator TG. The inside view illustrates the turbine blades TB retracted.

Figure 7A:
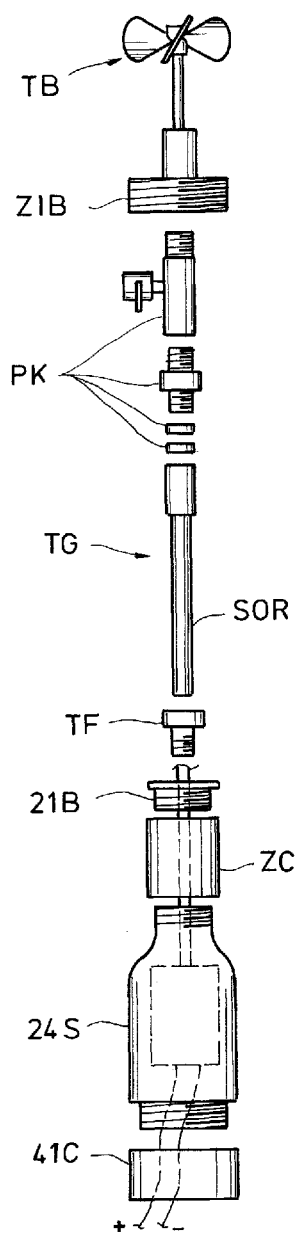
FIG. 7 is an illustration of an embodiment of a generator and turbine, the turbine having retractable and expandable blades.
Figure 7B:
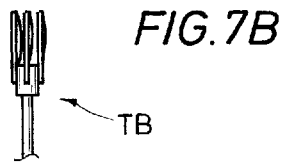

FIG. 7 illustrates the particular embodiment of the instant turbine generator separated into parts. FIG. 7 illustrates the turbine generator including for instance a 4-inch cup, a 2-inch to 4-inch swedge, a 2-inch collar, a 2-inch to 1-inch bushing, a tubing fitting, a stainless steel outside rod, a series of sets of packing, a 2-inch to 1-inch bushing, a turbine shown with blades expanded and a turbine, alternately, shown with retracted blades.

Figure 8A:
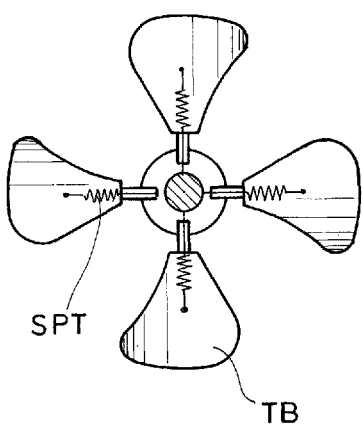
FIG. 8 illustrates an embodiment for expanded and retracted blades of a turbine.
Figure 8B:
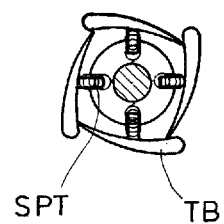

FIG. 8 illustrates one method of providing for expandable and retractable blades, in this case the blades are moved to their expanded position by means of a spring tensioner. To insert, the turbine is fitted inside the valve of the flow line. Once the turbine is inserted a flow of gas or liquid forces the turbine blades to expand allowing for more surface area. The turbine will begin to turn. The turbine is connected to the generator and will begin to create electricity.

FIG. 7 illustrates further how once the turbine of turbine generator TG is inserted into a line through the valve VE, the turbine blades TB will expand and begin to turn as fluid flows through flow line FL.

Figures 9, 10:
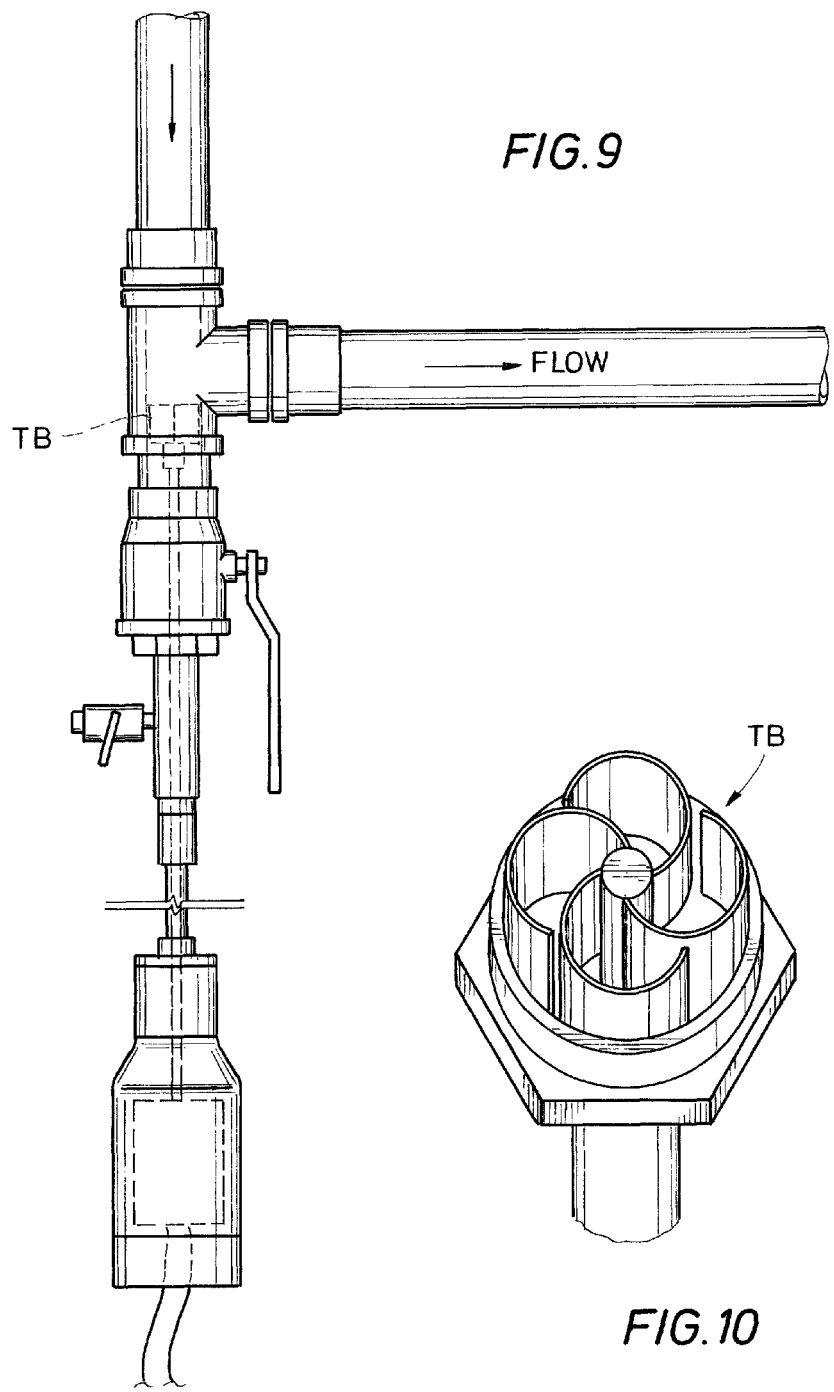
FIG. 9 illustrates a turbine with retractable blades having the blades expand once the turbine is inserted into the line.
FIG. 10 is a photo of a prototype of an embodiment of the instant invention illustrating turbine blades contracted to allow them to enter through a valve.

FIG. 10 is a photo of an early prototype of the instant invention showing turbine blades TB contracted in order to allow the blades to enter through valve VE. The turbine can vary in size depending on the valve and the line size into which it is being inserted.

Figures 11A, 11B:
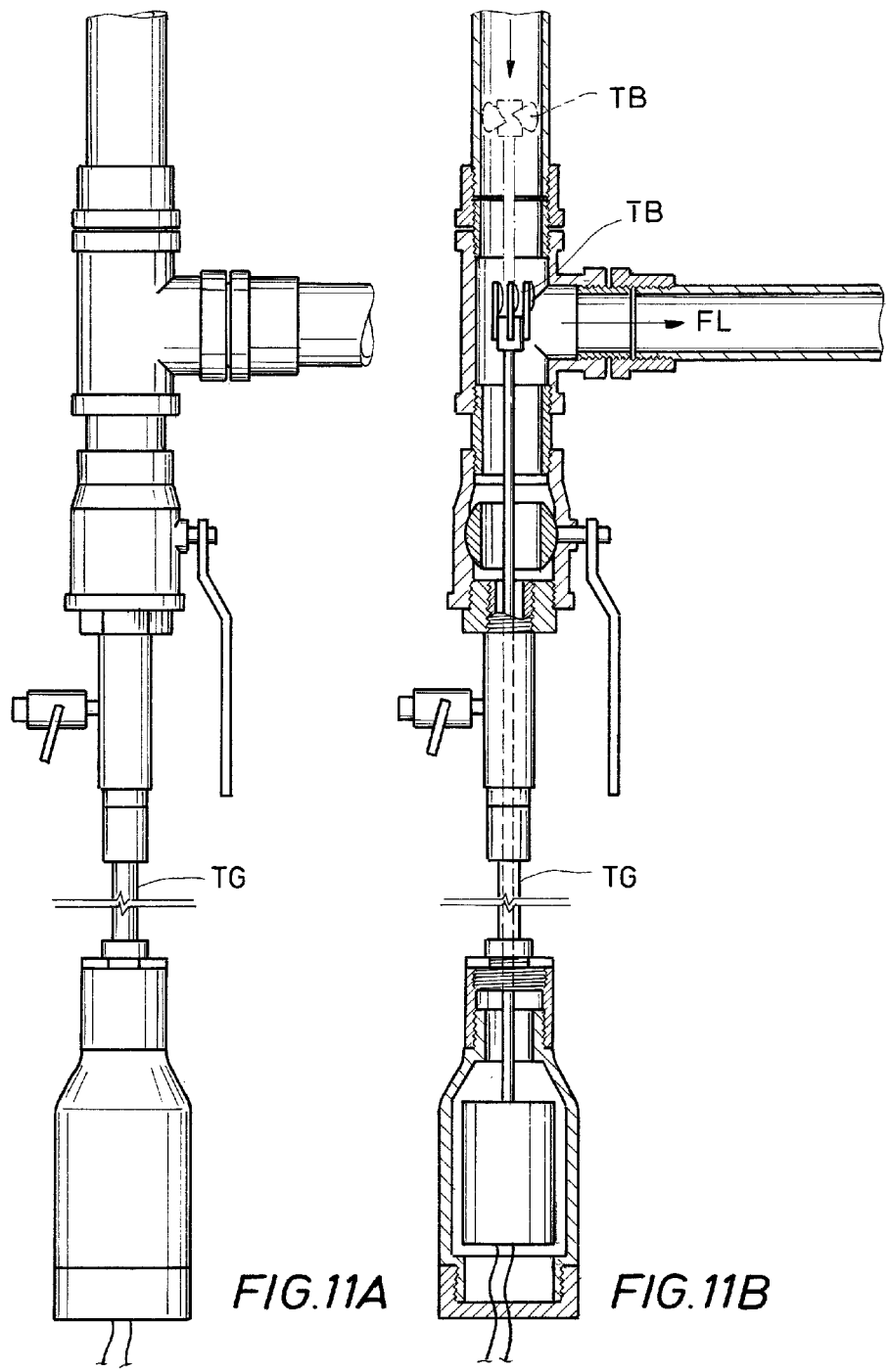
Figure 12B:
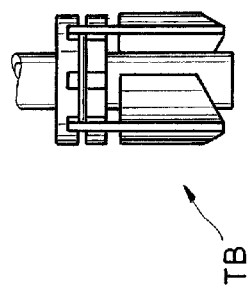
FIG. 12 offers four photograph of components of a prototype of an embodiment of the invention, illustrating expanded and retracted blades.
Figure 12D:
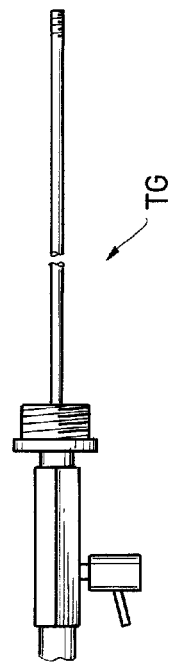
Figure 12A:
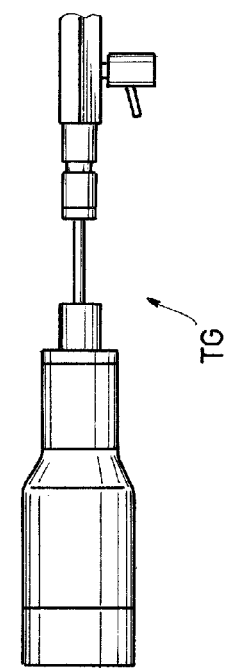
Figure 12C:
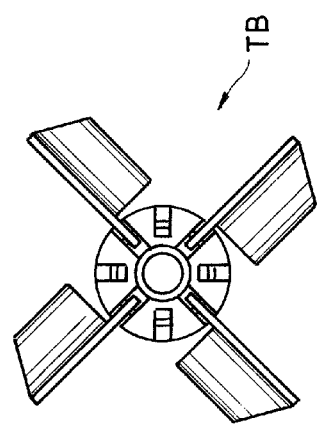

FIG. 11 illustrates, by illustration and photo, that once the turbine is inserted into a flow line the blades expand and fluid or gas forces the blades to turn as the fluid or gas passes by. The turbine is shown connected to a shaft which is enclosed in another shaft that is connected to the generator. By this process electricity is created.

FIG. 12 provides 4 photos of component parts of a prototype of the above turbine generator, in particular showing expanded blades and contracted blades for insertion. FIG. 13 combines a photo of a prototype of the above turbine generator together with an illustration of where the turbine generator TG would pass through valve VE in the elbow of flow line of FL such that when inserted the turbine blades TB would expand and be moved by the flow of fluid. FIG. 13 also illustrates electric lines exiting the generator and connecting to battery BT in order to charge the battery. FIG. 13 also illustrates solar panels connected to the battery to further charge the battery.

FIG. 14 illustrates a second embodiment of the instant invention. The second embodiment is particularly applicable when it does not appear necessary to be constrained to inserting a turbine through a pre-existing valve in a fluid flow line, such as a flow line containing sour gas. In the embodiment of FIG. 14 piping is inserted into a flow line in order to provide a secondary flow path for gas or fluid SFF. A capsule CAP may be provided for a turbine generator TG such that flow through and by the capsule CAP turns the turbine generator TG to generate electricity. The electricity generated is shown connected through voltage regular VR to charge battery BT.

Figure 15:
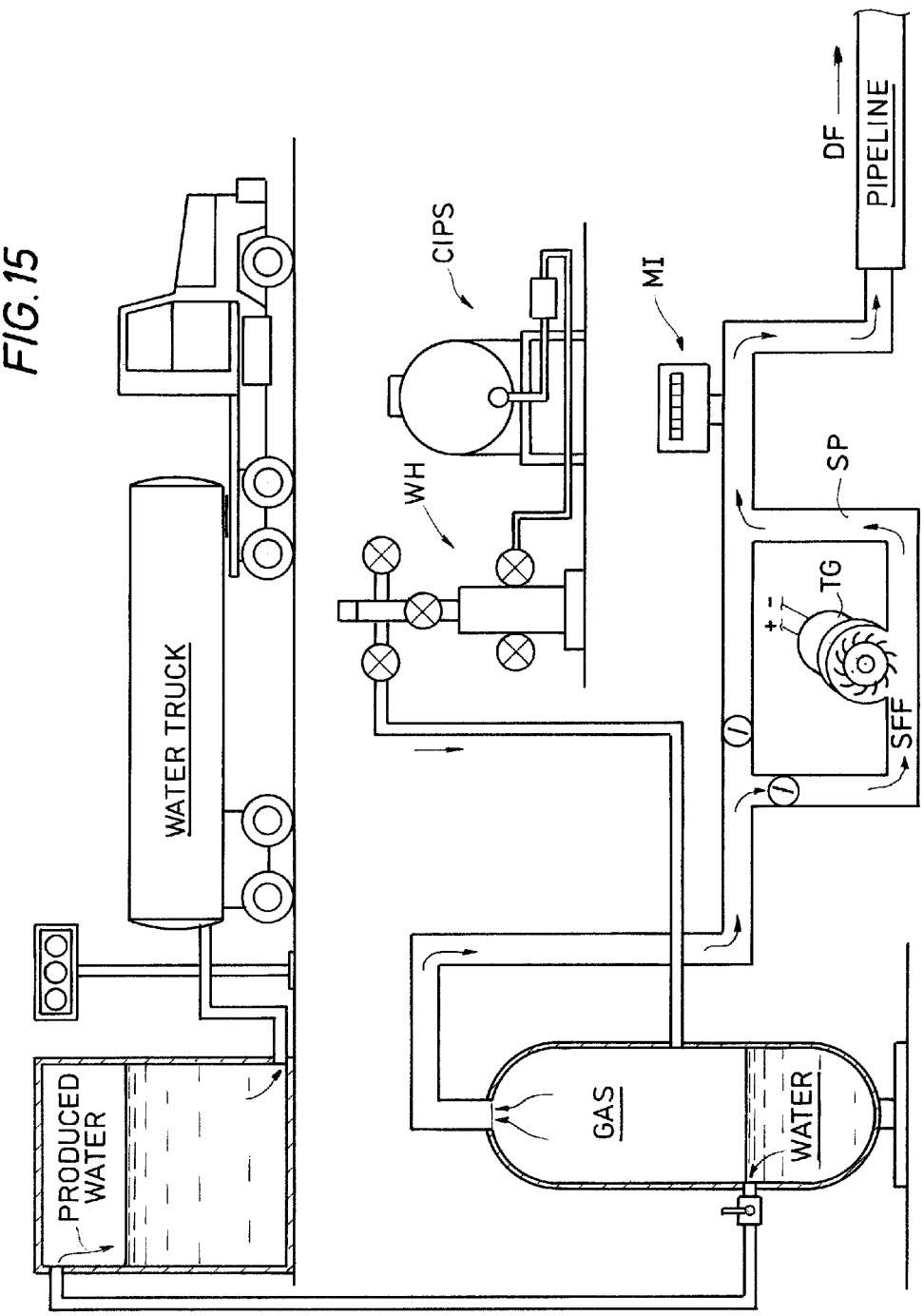
FIG. 15 illustrates in greater detail a wellhead site and the second embodiment of the invention where a turbine is moved by fluid flowing through secondary piping, the secondary piping inserted into a flow line from a wellhead toward downstream facilities.

FIG. 15 illustrates the insertion of the embodiment of FIG. 14 at a wellhead configuration. Flow of gas from wellhead WH is shown passing through the chemical injection pump system CIPS and into a gas water separator. From thence the gas flows through the flow line and toward a downstream facility DF. In the flow line secondary piping SP is inserted creating a secondary path for fluid flow SFF. The secondary fluid flow turns generator TG attached to the secondary piping. Measuring instruments MI are shown downstream of the secondary piping.

Figure 16:
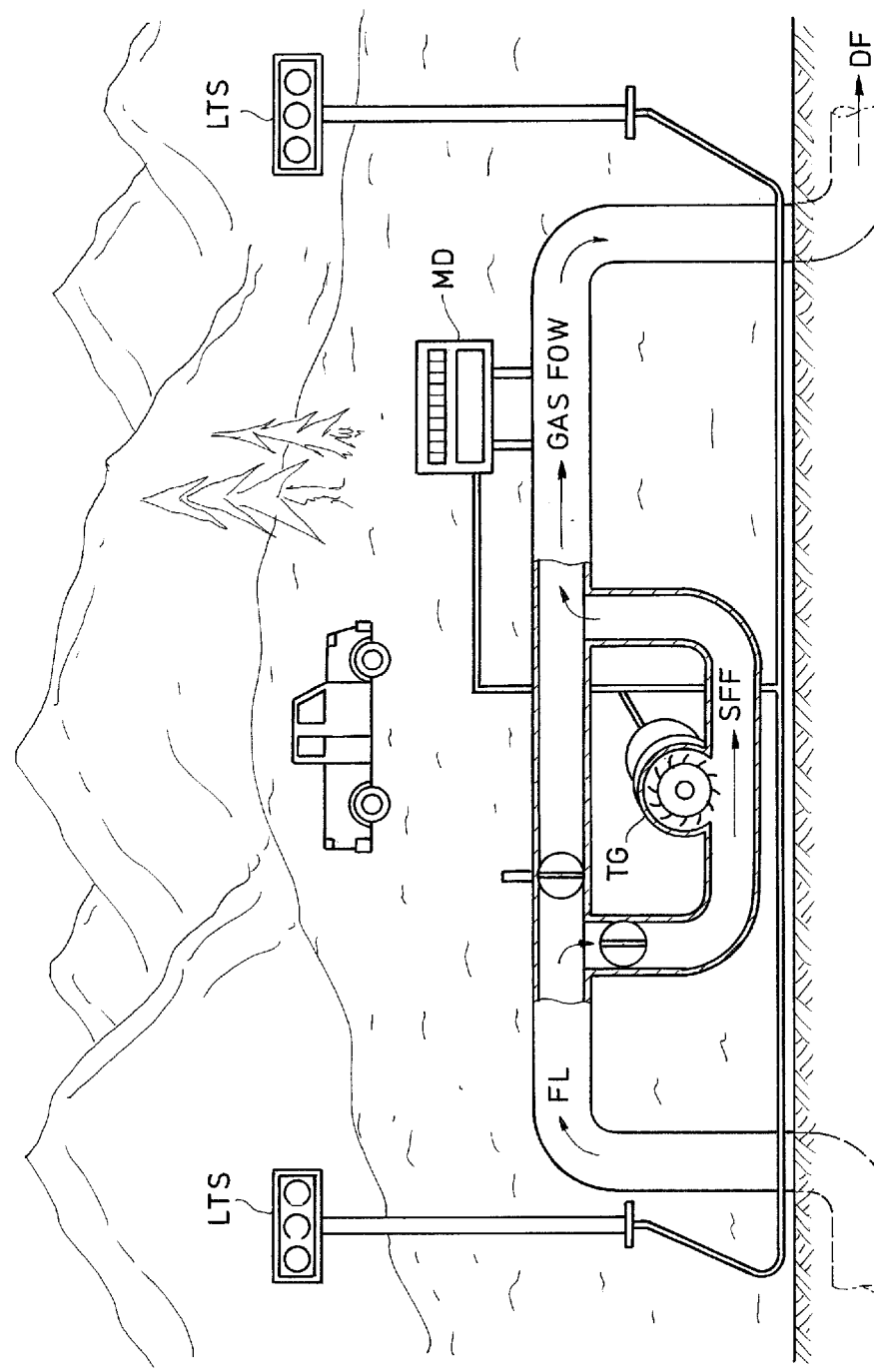
FIG. 16 illustrates the second preferred embodiment wherein secondary piping is inserted into a fluid flow line, placing the turbine in communication with fluid flowing through the secondary line.

FIG. 16 illustrates again an embodiment of the invention wherein secondary piping is inserted in a gas flow line to create a secondary flow that turns a turbine. In this embodiment power for measuring device MD is supplied directly from turbine generator TG. Likewise power for lights LTS is supplied directly from generator TG.

The foregoing description of preferred embodiments of the invention is presented for purposes of illustration and description, and is not intended to be exhaustive or to limit the invention to the precise form or embodiment disclosed. The description was selected to best explain the principles of the invention and their practical application to enable others skilled in the art to best utilize the invention in various embodiments. Various modifications as are best suited to the particular use are contemplated. It is intended that the scope of the invention is not to be limited by the specification, but to be defined by the claims set forth below. Since the foregoing disclosure and description of the invention are illustrative and explanatory thereof, various changes in the size, shape, and materials, as well as in the details of the illustrated device may be made without departing from the spirit of the invention. The invention is claimed using terminology that depends upon a historic presumption that recitation of a single element covers one or more, and recitation of two elements covers two or more, and the like. Also, the drawings and illustration herein have not necessarily been produced to scale.

What is claimed is:

1. A pipeline turbine generator for generating electricity from fluid flowing in a fluid line, the line associated with, and downstream of, a wellhead and generally proximate a chemical injection pump, the pipeline turbine generator comprising:

a turbine and associated generator, structured and sized and scaled appropriate to charge a 12-volt battery;

the turbine having retractable and extendable blades structured, in contracted configuration, to insert into and remove from a valve, the valve located on the fluid line running from the wellhead toward a downstream facility and proximate the chemical injection pump.

2. The pipeline turbine generator of claim 1 including blades structured to contract upon insertion into and upon extraction from the valve and to expand upon full insertion through the valve into the flow line.

3. The pipeline turbine generator of claim 1 including the valve located proximate an elbow of the fluid flow line.

4. The pipeline turbine generator of claim 1 wherein the fluid includes natural gas.

5. The pipeline turbine generator of claim 1 wherein the fluid includes sour gas.

6. The pipeline turbine generator of claim 1 wherein the valve comprises a pre-existing valve structured for insertion of an instrument into the fluid flow line.

7. The pipeline turbine generator of claim 1 including an electric line from the generator to a battery associated with the injection pump.

8. The pipeline turbine generator of claim 1 including an electric line from the generator to the injection pump for communicating electric power.

\* \* \* \* \*